United States Patent [19]

Bigham

[11] Patent Number: 5,339,889

[45] Date of Patent: Aug. 23, 1994

[54] CONTROLLED BIOCIDE FEEDER FOR COOLING WATER SYSTEMS

[76] Inventor: Fred L. Bigham, 4206 SE. 11th Ave., Portland, Oreg. 97202

[21] Appl. No.: 933,356

[22] Filed: Aug. 19, 1992

[51] Int. Cl.$^5$ .............................................. E03B 11/00
[52] U.S. Cl. ............................................ 165/1; 137/1; 137/268; 137/101.25
[58] Field of Search .................... 137/268, 101.25, 1; 165/1

[56] References Cited

U.S. PATENT DOCUMENTS

| | | | |
|---|---|---|---|
| 1,165,608 | 12/1915 | Kuth | 137/268 |
| 4,026,673 | 5/1977 | Russo | 137/268 |
| 4,594,091 | 6/1986 | Girvan | 514/64 |
| 4,692,314 | 9/1987 | Etani | 137/268 |
| 5,131,938 | 7/1992 | Girvan | 71/67 |
| 5,142,058 | 8/1992 | Willingham et al. | 548/213 |

Primary Examiner—A. Michael Chambers
Attorney, Agent, or Firm—Stoel Rives Boley Jones & Grey

[57] ABSTRACT

In accordance with the present invention, a controlled biocide feeder limits growth of bacteria (e.g., Legionella pneumophila) in heat transfer water of building air conditioning systems. Preferably, a flow of heat transfer water is directed across a solid biocidal material, such as 1-Bromo-3-chloro-5, 5-dimethylhydantoin (BCDMH) to form a biocidal solution. A biocide control valve responsive to a heat transfer control signal corresponding to an amount of water used in the heat transfer system for passing biocidal solution to the water used in the heat transfer system to provide a biocidal material concentration of less than 12 parts-per-million to prevent corrosion of the air conditioning system. Preferably, the concentration is between about 1.5 and 3 parts-per-million of BCDMH.

12 Claims, 2 Drawing Sheets

CONTROLLED BIOCIDE FEEDER FOR COOLING WATER SYSTEMS

TECHNICAL FIELD

The present invention relates to controlling the growth of microbes in cooling water systems for industrial and commercial buildings and, in particular, to controlling the growth of Legionella pneumophila in such systems.

BACKGROUND OF THE INVENTION

Air conditioning systems for commercial and industrial buildings typically employ water as a heat transfer medium for transferring heat from within the building to an evaporative cooling tower outside the building. The heat transfer water is cooled within the cooling tower by being sprayed over evaporation condensers that evaporate a portion of the water to outside air. The remaining heat transfer water is recirculated through the air conditioning system.

Evaporation condensers are usually exposed to unfiltered outside air. As a consequence, various impurities or contaminants such as, for example, dust, algae, fungus and bacteria, can enter the recirculated heat transfer water. One contaminant that is common to cooling water systems is the bacteria Legionella pneumophila. This bacteria is particularly undesirable because it can sometimes cause various health problems for persons in the building treated by the air conditioning system. Moreover, the bacteria can thrive in the heat transfer water because it is maintained at a temperature of between, for example, 80°–105° F. (26–40° C.).

Biocides are added to many cooling water systems to control L. pneumophila and other bacteria. Biocides are available in liquid or solid form. Liquid biocides (e.g., Product 490 and Product 480 sold by Chemex of Portland, Oregon) are undesirable because they are dangerous to handle and store. In contrast, solid biocides, such as 1-Bromo-3-chloro-5, 5-dimethylhydantoin (BCDMH) distributed in tablet form as Product 492 by Chemax of Portland, Oregon are relatively safe to handle because of their generally inert form.

One method of adding solid biocides to the heat transfer water is to run a small constant flow of make-up (i.e., fresh) water over the biocide tablets and into the cooling tower sump. This method is undesirable because it causes biocide-laden water to overflow the sump when the air conditioning system is off and applies insufficient biocide when the system operates at conventional loads.

In another method, solid biocide is held in a perforated container that resides in the sump of the cooling tower and allows the biocide to dissolve continuously into the heat transfer water. Such an apparatus is undesirable, however, because it does not control the concentration of dissolved biocide in the heat transfer water. For example, a concentration of BCDMH greater than about 12 parts per million of residual chlorine can result in corrosion of many components of the cooling water system. Such concentrations are easily exceeded by this method.

SUMMARY OF THE INVENTION

An object of the present invention is, therefore, to provide a biocide feeder for cooling water systems.

Another object of this invention is to provide such a feeder that applies a controlled amount of biocide to a cooling water system based on air conditioning load.

A further object of this invention is to provide such a system that employs solid biocides.

In accordance with the present invention, a controlled biocide feeder limits growth of bacteria (e.g., Legionella pneumophila) in heat transfer water of building air conditioning systems. Preferably, a flow of heat transfer water is directed across a solid biocidal material, such as tablets having 1-Bromo-3-chloro-5, 5-dimethylhydantoin (BCDMH), to form a biocidal solution. A biocide control valve is responsive to a heat transfer control signal corresponding to an amount of water used in the air conditioning system (i.e., the load) for passing the biocidal solution to the water used in the heat transfer system to provide a biocidal material concentration of less than 12 parts-per-million to prevent corrosion of the air conditioning system. Preferably, the concentration of BCDMH is between about 1 and 3 parts-per-million measured as chlorine residual.

Additional objects and advantages of the present invention will be apparent from the following detailed description of a preferred embodiment thereof, which proceeds with reference to the accompanying drawing.

DETAILED DESCRIPTION OF PREFERRED EMBODIMENTS

Figure 1:
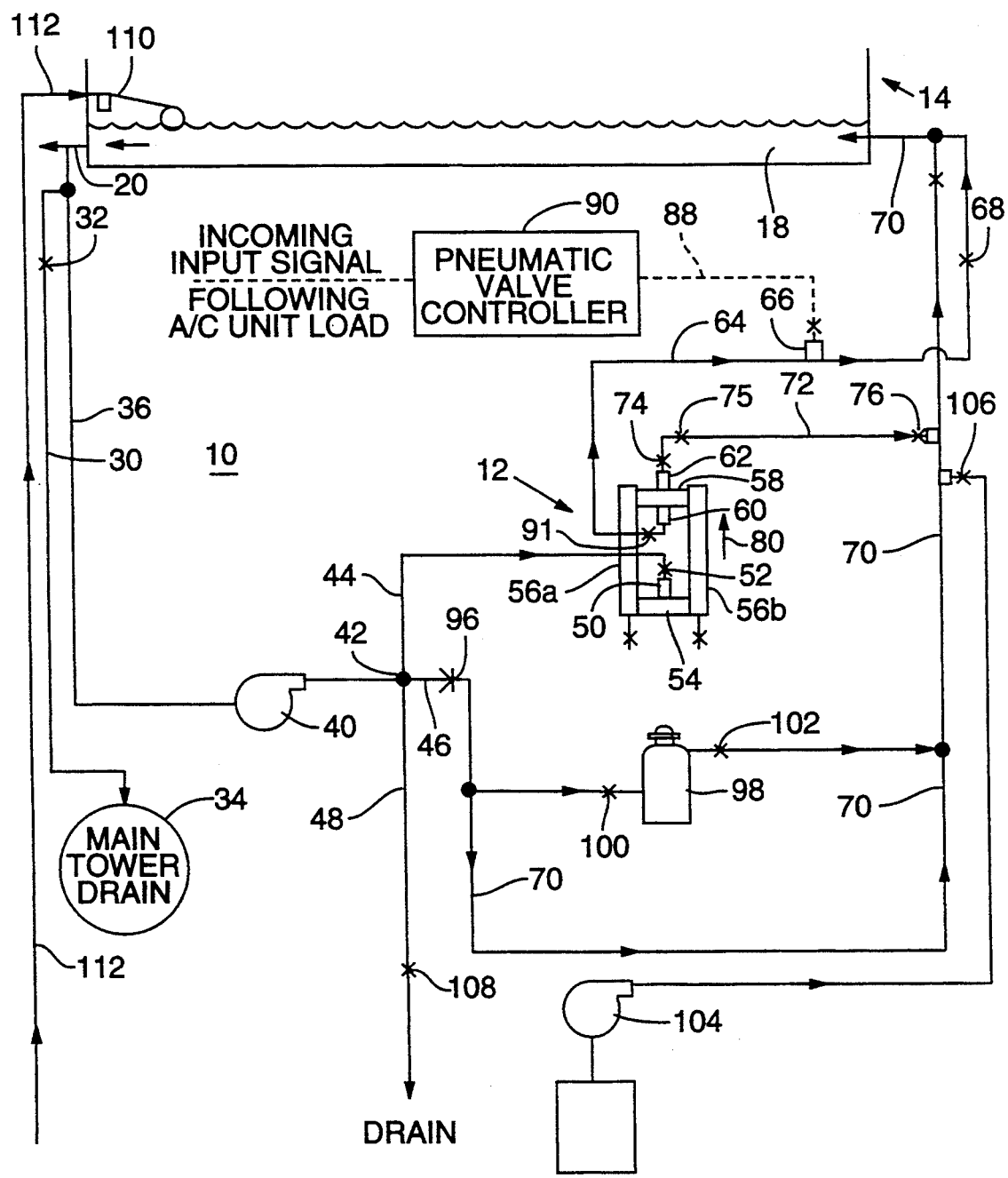
FIG. 1 is a schematic diagram of a cooling water system with a biocide feeder of the present invention.

FIG. 1 is a schematic diagram of a portion of an air conditioning cooling water system 10 having a controlled automatic biocide feeder 12 of the present invention. Cooling water system 10 is of the type employed, for example, in a high-rise commercial building, but is similarly applicable to other recirculated cooling water systems. Arrowheads in FIG. 1 represent directions of fluid flow.

Cooling water system 10 includes a cooling tower 14 (only partly shown) that receives and sprays heated heat transfer water over evaporative condensers (not shown). The cooled heat transfer water flows down to a cooling tower sump 18 from which the water is drawn through an outlet 20 to be recirculated through system 10.

A drain line 30 with a normally-closed valve 32 extends from outlet 20 to a main tower drain 34 for selectively draining cooling tower sump 18 for maintenance purposes. A small-diameter biocide feeder branch line 36 is connected to drain line 30 above valve 32. A feeder pump 40 draws heat transfer water through branch line 36 and drives the water through a 4-way junction 42 to branches 44, 46 and 48. Biocide feeder system 12 is located along branch 44.

Figure 2:
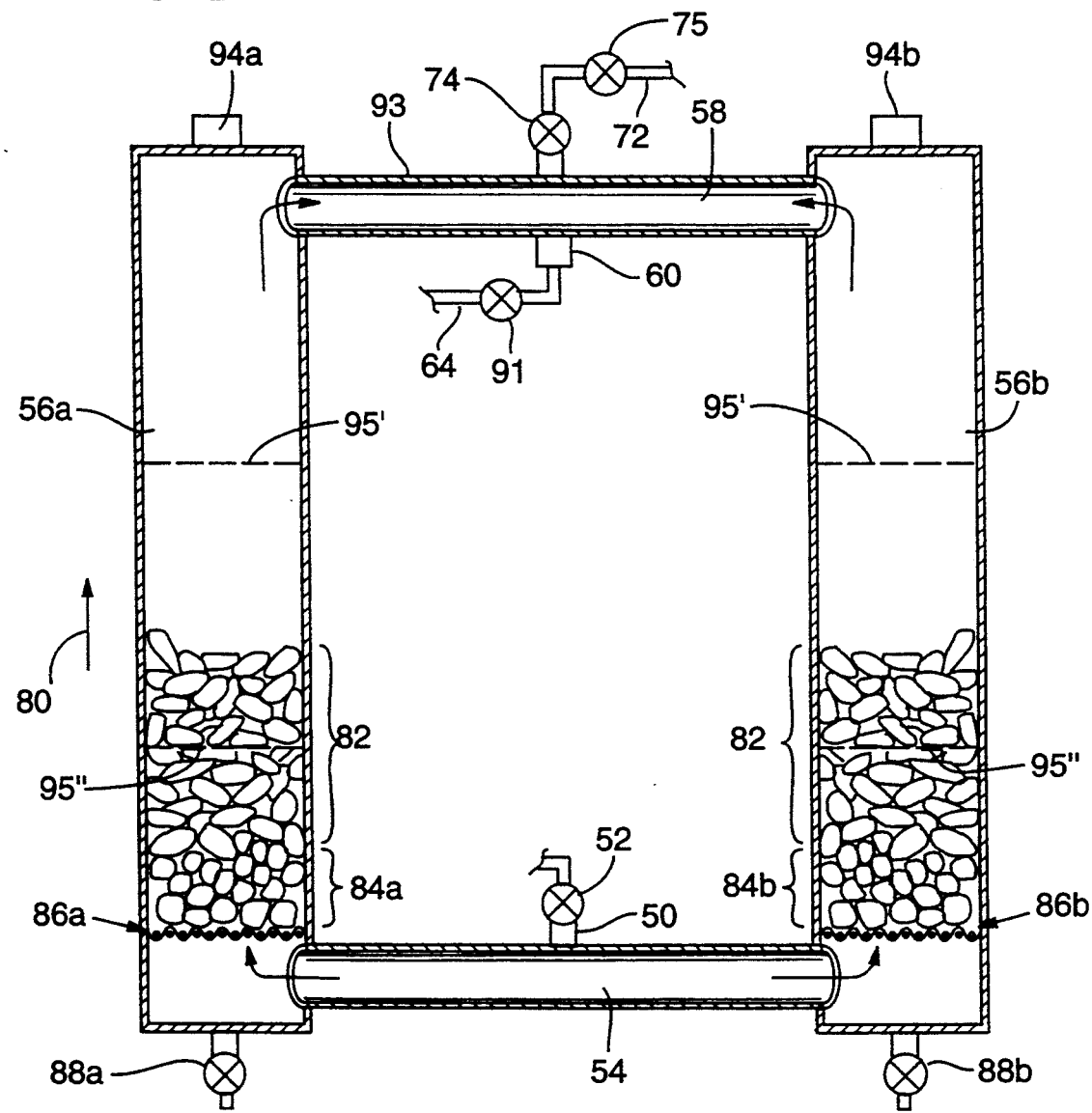
FIG. 2 is a fragmentary isometric front view of a biocide feeder of the present invention.

With reference to FIGS. 1 and 2, biocide feeder system 12 includes an inlet 50 with a normally-open valve 52 for receiving the heat transfer water drawn from cooling tower sump 18. A T-junction 54 directs the heat transfer water through a pair of biocide feeder columns 56a and 56b to a common outlet branch 58 having a pair of outlet couplings 60 and 62. Outlet coupling 60 is connected by a biocide feed line 64 through an automatic variable flow control valve 66 and a return service valve 68 to a main return line 70. Outlet coupling 62 is connected by a constant maintenance feed line 72 with manual valves 74, 75 and 76 at opposite ends thereof to return line 70.

The heat transfer water provided by pump 40 preferably flows through each of feeder columns 56a and 56b in an upward direction 80 over plural biocide tablets 82. Tablets 82 preferably include 1-Bromo-3-chloro-5, 5-dimethylhydantoin (BCDMH), such as those sold as Product 492 by Chemax of Portland, Oregon. Tablets 82 are supported within columns 56a and 56b by plural inert support balls 84a and 84b (e.g., golf balls) positioned over plural crossed support ribs 86a and 86b, respectively.

Support balls 84 and support ribs 86 cooperate to hold tablets 82 within columns 56a and 56b while allowing a flow of heat transfer water over tablets 82. Feeder columns 56a and 56b are preferably formed of transparent or translucent PVC tubes of 4 inch (10 cm) nominal diameter to allow simple visual monitoring of tablets 82. Drain valves 88a and 88b positioned at the bottoms of respective feeder columns 56a and 56b allow feeder 12 to be drained and cleaned.

Feed lines 64 and 72 carry, respectively, variable and fixed amounts of biocide concentrate to main return line 70. During conventional operation, valves 74, 75 and 76 on constant feed line 72 are open to replace biocide lost through evaporation. Automatic variable control valve 66 controls the amount of biocide concentrate delivered to return line 70 in accordance with a pneumatic control pressure delivered via a pressure line 90 by a pneumatic valve controller 92 in accordance with an air conditioning load signal generated by the air conditioning system. The load signal relates specifically to a cooling tower return water temperature signal and is available from a pnuematic or electronic sensor included in most conventional air conditioning systems. It will be appreciated that the load signal may relate to other air conditioning system parameters such as, for example, the head pressure or the electrical load of the refrigeration unit.

Automatic variable control valve 66 preferably controls the amount of biocide concentrate delivered to return line 70 based on a linear relationship between a maximum air conditioning load and shut-down of the air conditioning system. More specifically, valve controller 90 is calibrated to open control valve 66 to provide a concentration of BCDMH in sump 18 of 1–3 parts-per-million measured as chlorine residual at a maximum air conditioning load. Valve controller 92 then functions to close control valve 66 by amounts directly proportional to amount the air conditioning system is below maximum load; closing control valve 66 completely when the air conditioning system shuts down.

For example, one exemplary air conditioning system evaporates up to about 600 gallons (2300 liters) of water per 12-hour period, thereby requiring the simultaneous addition of 600 gallons (2300 liters) of fresh make-up water and a corresponding amount of biocide concentrate over the same period. Valve controller 92 is programmed to have a maximum open position that provides the predetermined biocide concentration of 1–3 parts-permillion in sump 18 under these circumstances. Valve controller 92 then closes valve 66 by amounts proportional to the amount by which the air conditioning system is operating below maximum load. Control valve 66 is preferably a model VP531A-1012 manufactured by Honeywell of Arlington Heights, Illinois and valve controller 92 is preferably a model RP920A also manufactured by Honeywell.

During shut-down of the air conditioning system, such as during evening or weekend hours, valves 74, 75 and 76 are open and control valve 66 is closed. As a result, constant feed line 72 provides a fixed low-volume application of biocide concentrate to return line 70. The amount of biocide applied is manually adjusted with valve 75. This low volume application can be set at a particular volume to accommodate expected rainfall into, or evaporation of BCDMH from, the water in cooling tower 14. As an alternative to constant feed line 72, control valve 66 could be set to provide an analogous flow of biocide concentrate to main return line 70 during shutdown.

Preferably, T-junction 54, outlet branch 58 and feed lines 64 and 72 are constructed of copper tubing or, alternatively, PVC, nylon braid, or nylon tubing. T-junction 54 and outlet branch 58 have nominal diameters of 4 inches (10 cm), PVC feed line 64 has a nominal outer diameter of ⅜ inch (0.95 cm.) and feed line 72 has a nominal outer diameter of ¼ inch (0.6 cm). PVC and other non-metallic materials for feeder 12 and feed lines 64 and 72 have greater resistance to the corrosive effects of the biocide concentrate therein. Applying the biocide concentrate to return line 70 functions to dilute the biocide concentrate before it enters sump 18, where the biocide is mixed with the cooling water.

A maintenance valve 91 allows feeder 12 to be isolated from feed line 64 for service or cleaning. A rolled nylon fine mesh 93 inside outlet branch 58 functions to block fragments of tablets 82 from entering and obstructing feed lines 64 and 72. End caps 94a and 94b provide access to feeder 12 for cleaning and replenishing tablets 82. A pair of bands 95' and 95" positioned on each of columns 56a and 56b mark the respective maximum and minimum quantities of tablets 82 to maintain a desired biocide concentration.

It will be appreciated that cooling water system 10 could include manual chemical feeders for adding chemicals other than solid biocides to the heat transfer water. With respect to FIG. 1, branch 56 from four-way junction 42 passes through a one-way check valve 96 to a chemical mixing pot 98 positioned between valves 100 and 102 and coupled to main return line 70. Similarly, a manual liquid feeder pump 104 may be connected to return line 70 through a valve 106. Mixing pot 98 and feeder pump 104 may be used to apply, for example, an anticorrosive such as organophosphonate. Branch 48 from four-way junction 42 extends through a valve 108 to a drain. A float valve 110 controls the addition of makeup (i.e., fresh) water to sump 18 from an incoming water line 112.

It will be obvious to those having skill in the art that many changes may be made to the details of the above-described preferred embodiment of the present invention without departing from the underlying principles thereof. For example, pump 104 could be an automatically-controlled motor-driven pump that is controlled in a manner similar to that in which pneumatic valve 66 is controlled, thereby allowing the controlled application of liquid biocides. The scope of the present invention should be determined, therefore, only by the following claims.

I claim:

1. A method of controlling bacteria in an aqueous air conditioning heat transfer system, comprising the steps of:

generating a heat transfer control signal corresponding to an amount of water used in the heat transfer system;

directing a flow of heat transfer water across a source of biocidal material in accordance with the heat transfer control signal to form a biocidal solution;

applying the biocidal solution to the heat transfer system to provide a biocidal material concentration of within a predetermined range of concentrations.

2. The method of claim 1 in which the biocidal material is in solid form.

3. The method of claim 1 in which the biocidal material includes bromochlorodimethylhydantoin.

4. The method of claim 3 in which the predetermined range of concentrations is between about 1.5 and 3 parts-per-million of bromochlorodimethylhydantoin.

5. The method of claim 1 in which an automatic variable flow control valve is controlled to apply the biocidal solution to provide the biocidal material concentration within the predetermined range of concentration 6. The method of claim 1 in which the predetermined range of concentrations of biocidal material is sufficient to prevent growth of *L. pneumophila*.

7. An aqueous heat transfer system biocide feeder for controlling bacteria in heat transfer water, comprising:

biocide feeding means for directing a flow of heat transfer water across a source of biocidal material to form a biocidal solution;

a biocide control applicator responsive to a heat transfer control signal corresponding to an amount of water used in the heat transfer system for passing biocidal solution to the water used in the heat transfer system to provide a biocidal material concentration of within a predetermined range of concentrations.

8. The feeder of claim 7 in which the biocidal material is in solid form.

9. The feeder of claim 7 in which the biocidal material includes bromochlorodimethylhydantoin.

10. The feeder of claim 9 in which the predetermined range of concentrations is between about 1.5 and 3 parts-per-million of bromochlorodimethylhydantoin.

11. The feeder of claim 7 in which the biocide control applicator includes an automatic variable flow control valve.

12. The feeder of claim 7 in which the predetermined range of concentrations of biocidal material is sufficient to prevent growth of *L. pneumophila*.

* * * * *